United States Patent [19]
Betz

[11] Patent Number: 5,823,682
[45] Date of Patent: Oct. 20, 1998

[54] THERMOELECTRIC SENSOR

[75] Inventor: Josef Betz, Regensburg, Germany

[73] Assignee: Fortech HTS GmbH, Regensburg, Germany

[21] Appl. No.: 795,572

[22] Filed: Feb. 6, 1997

[30] Foreign Application Priority Data

Feb. 14, 1996 [DE] Germany ............ 196 05 384.6

[51] Int. Cl.⁶ .................................................. G01J 5/00
[52] U.S. Cl. ............................................................ 374/130
[58] Field of Search ............................. 374/130, 131, 374/121; 372/22, 69, 92; 359/326

[56] References Cited

U.S. PATENT DOCUMENTS 3,963,925 6/1976 Breazeale .
5,142,542 8/1992 Dixon ........................................ 372/22

FOREIGN PATENT DOCUMENTS 0463982 6/1991 European Pat. Off. .
4306497 7/1993 Germany .
4428844 6/1995 Germany .

OTHER PUBLICATIONS

Patent Abstract of Japan, vol. 009, No. 296 (p. 407) Nov. 22, 1985.

Alda J et al. "Moment of Light Beams by Using Polynomial Transmittance Window".

Primary Examiner—William L. Oen
Attorney, Agent, or Firm—Hoffman, Wasson & Gitler

[57] ABSTRACT

The invention relates to a novel thermoelectric sensor for determining or measuring the thermal power of radiation, especially laser radiation, with at least one thermoelectric detector or sensor element which has an active detector surface of a thin active layer of a crystalline solid with anisotropic thermoelectric power and in which the surface perpendicular of the layer does not coincide with one of the primary anisotropy directions, on the thin active layer there being at least two contacts for tapping a voltage dependent on the thermal output.

10 Claims, 3 Drawing Sheets

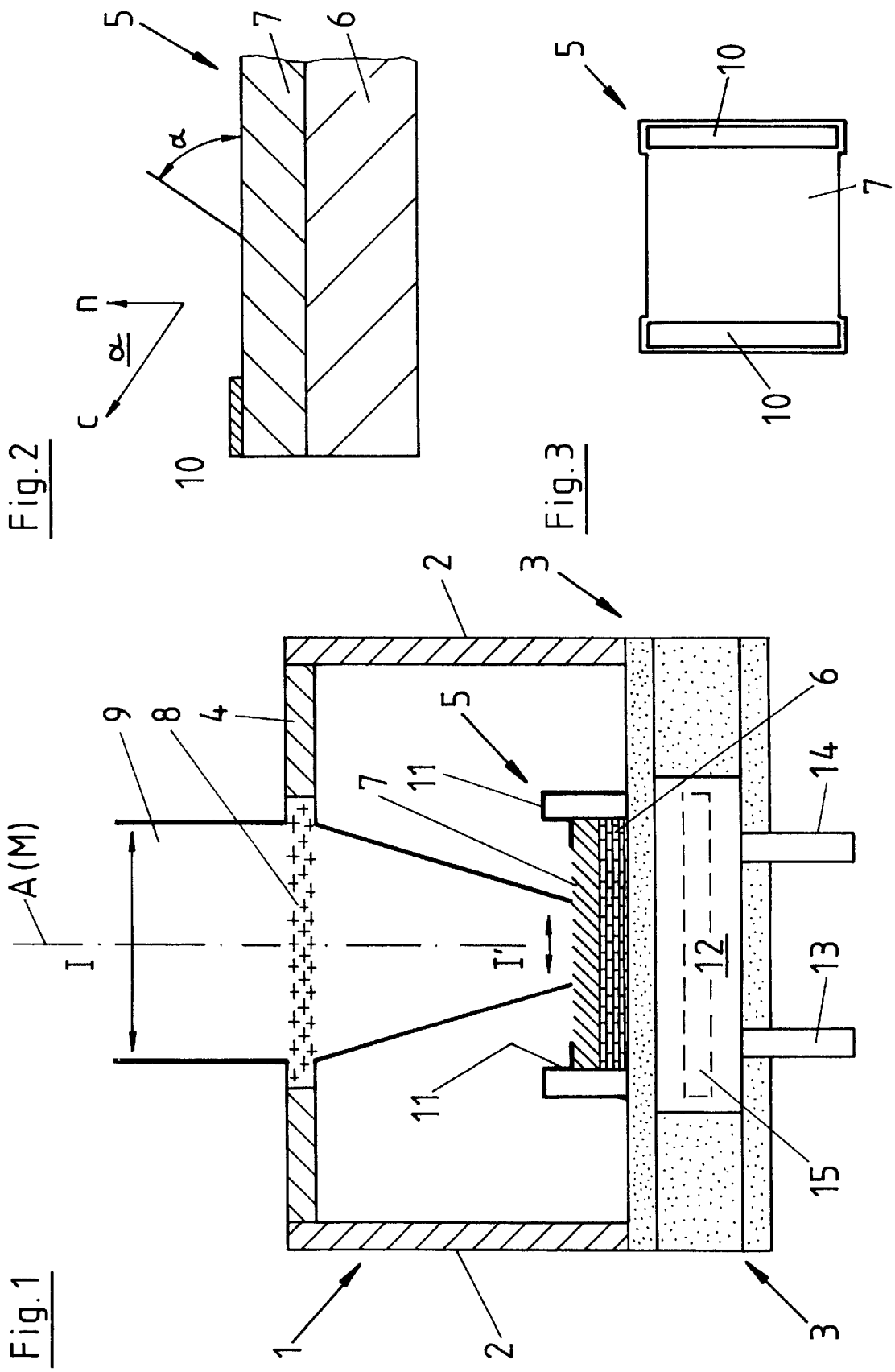

THERMOELECTRIC SENSOR

BACKGROUND OF THE INVENTION

The invention relates to a thermoelectric sensor for determining or measuring the thermal power of radiation, especially laser radiation, with at least one thermoelectric detector or sensor element which has a thin active layer of a crystalline solid on an active detector surface.

A sensor of this type is known as a thermoelectric detector for detecting continuous and pulsed radiation (DE 43 06 497 C2). A detector of this type can be used as a fast-reacting sensor for measurement of the thermal power of radiation, especially laser radiation. The active layer consists of a thin anisotropic high temperature superconductor layer which is grown on a single-crystalline substrate with a tilt angle. On contact surfaces a voltage can be tapped which is proportional to the temperature gradient between the temperature on the top of the active layer and the temperature which the active layer has at the transition to the substrate.

The known thermal detector has the advantage that the active layer can be made very thin with low mass and in this way, very short time constants in the ns range can be achieved.

A particular disadvantage of the thermal detector is that under continuous loading or radiation, especially with continuous loading with higher average power, the known thermoelectric detector or its output voltage has a pronounced drift behavior which is reflected in the measurement or output voltage drops in spite of constant irradiation. The disadvantage of the known detector is also that this signal drift is dependent on the motion of the radiation incident on the active layer along this active layer, i.e., motion for example of one millimeter can increase signal drift by a factor of 10.

The object of the invention is to avoid these disadvantages and to devise a sensor which delivers an output voltage which is proportional to power and which has drift reduced to a negligible value upon continuous irradiation.

A sensor characterized by optics which are placed in the path of the beam to be measured, and image this beam on the surface of the active layer in a spot with a fixed diameter which is smaller in each axial direction than the dimensions of the active layer and by a cooling element contained in the sensor.

SUMMARY OF THE INVENTION

In the sensor according to the invention, the optics reduce the diameter of the beams to be measured at a time (for example, a laser beam) such that the beam or spot imaged on the active layer has an area which is much smaller than the area of the active layer, for example, is equal to 50% or is less than 50% of the area of the active layer. The beam center is located in the middle relative to the contacts. In this way, the heat generated by the incident beam in the active layer can drain, via the substrate, without the build-up of lateral temperature gradients which lead to drift of the output voltage.

One important component of the invention is symmetrical cooling which maintains the same temperature in the area of the two contacts and in the active layer. As a result, no temperature gradients, which cause drift of the output signal, can build up.

BRIEF DESCRIPTION OF THE DRAWINGS

The invention is depicted by the following figures:

FIG. 1 shows in a simplified representation and in cross section one embodiment of the thermoelectric sensor according to the invention;

FIG. 2 shows in an enlarged individual representation a section through the substrate and the active detector layer of the detector element for use in the sensor of FIG. 1;

FIG. 3 shows an overhead view of the detector element of FIG. 1;

DETAILED DESCRIPTION OF THE INVENTION

Figure 4:
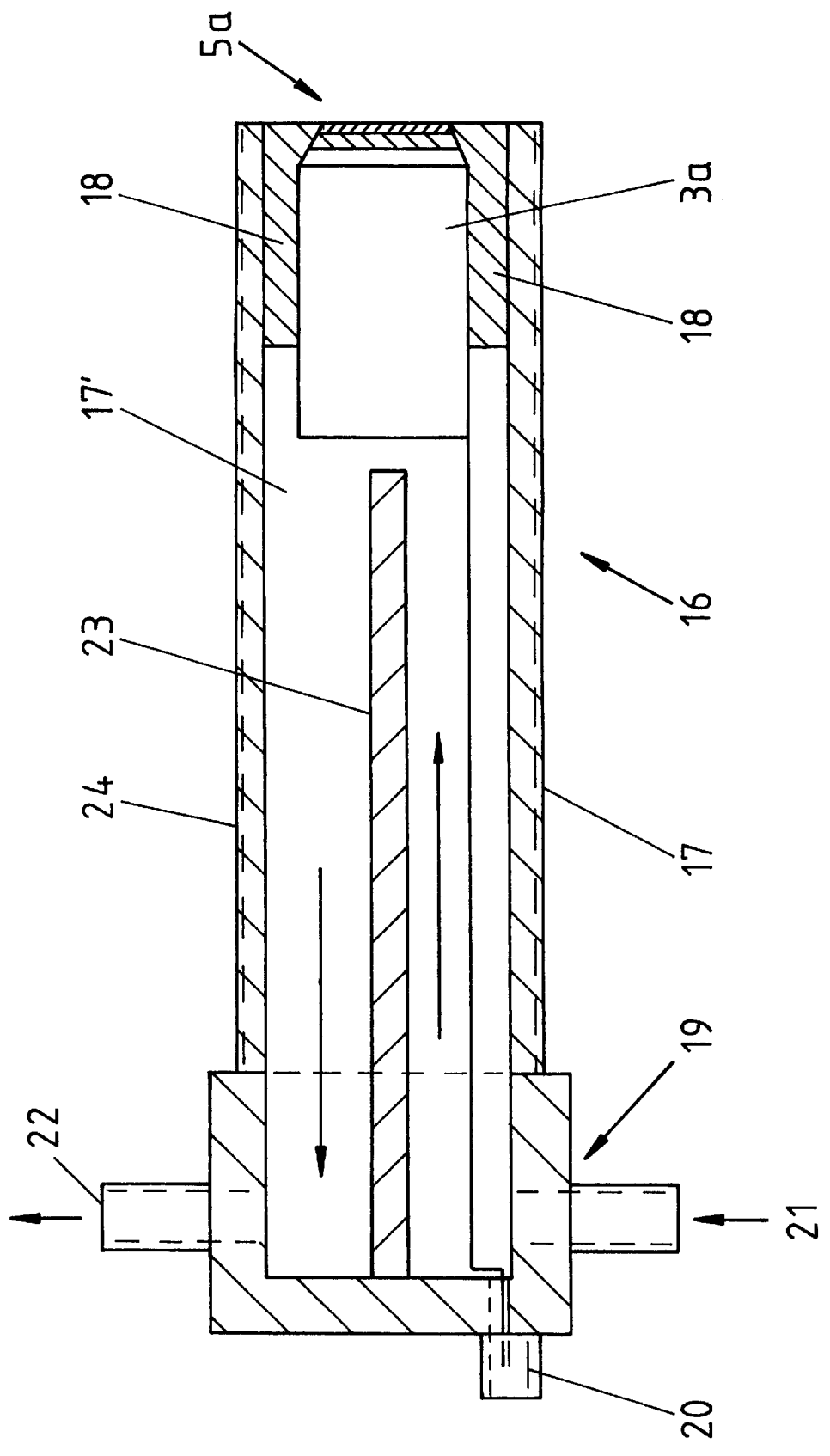
FIG. 4 shows in a simplified representation and in cross section a sensor suited for temperature measurement according to the invention.

The sensor shown in the figures contains a closed housing 1 with a peripheral wall 2, a housing bottom 3 and an upper housing termination 4.

Within the housing is a sensor element 5, which forms the active part of the sensor, and is positioned on bottom side 3, opposite housing termination 4.

Sensor element 5, which is illustrated in detail and in cross section in FIG. 2, is a thermoelectric detector, as is known to one skilled in the art from DE 43 06 497 C2. This detector consists of substrate 6 and a thin active layer 7 which is provided on one surface side of this substrate. This sensor element is mounted in the sensor such that layer 7 is facing housing termination 4 and lies in a plane which is perpendicular to optical axis A of optics 8 which is positioned to be adjustable on housing termination 4 in the direction of axis A and which images beam 9 to be measured (for example, a laser beam) on layer 7 in an area (spot), preferably in a circular area with diameter I' which is less than the corresponding dimensions of layer 7 and furthermore is smaller than diameter I of beam 9 to be measured before passage through optics 8.

In particular, active layer 7 is a thin layer of a crystalline solid with anisotropic thermoelectric power, the surface perpendicular of the layer not coinciding with one of the primary anisotropy directions.

For example, a high temperature superconductor is used as the thermoelectrically anisotropic material, alignment of the major anisotropy axes being achieved for example by epitaxial layer growth on a suitably oriented wafer which forms substrate 6. For example, high temperature superconductor $RBa_2Cu_3O_{7-\delta}$ (R=rare earth) is suitable as the thermoelectrically anisotropic material. The alignment of the axes of anisotropy takes place by the corresponding epitaxial growth on a wafer which forms substrate 6 and which is cut such that its (100) surfaces emerge at an angle $\alpha > 0$ from the substrate surface such that in epitaxial layer growth a corresponding angle between the surface perpendicular of layer 7 and the crystallographic c-axis of this layer also results.

To produce sensor element 5 for example it is possible to proceed as follows:

On a $SrTiO_3$ substrate, the (100) planes of which are inclined at an angle $\alpha$ ($\alpha > 0$) relative to the surface, a thin layer of high temperature superconductor $YBa_2Cu_3O_{7-\delta}$ (YBCO) is applied by laser ablation at 680° C. and 300 mTorr $O_2$ atmosphere. The YBCO (100) planes grow parallel to the $SrTiO_3$ (100) planes (FIG. 2). The crystallographic C-axis of the YBCO layer thus forms angle $\alpha$ with the surface perpendicular.

When beam 9 is incident on layer 7 the latter is strongly heated especially on its exposed top so that in the direction of the thickness of layer 7 a temperature gradient is formed which on the basis of angle α among others, parallel to the surface of layer 7, produces a voltage field which is dependent on this temperature gradient and thus the thermal energy of beam 9.

To accommodate the initial voltage which is dependent on the power of beam 9 and which is produced by heating of the surface of layer 7 two contacts 10 are used which in the embodiment shown are provided each along one edge of quadratic sensor element 5 on the top of layer 7 and which extend over the entire length of one side. Contacts 10 are formed by thin layers of gold by sputtering on these layers or contacts 10 with a laser. Especially in sensor element 5 this has the advantage that by sputtering, the material of contacts 10 also penetrates into layer 7 and thus especially high durability and adhesion for contacts 10 result.

The electrical connection to contacts 10 takes place via contact elements 11 which are made as contact springs and which at least on their contact surfaces consist of silver. Furthermore contact elements 11, especially also the transition to contacts 10, are sealed to prevent corrosion.

The initial voltage adjacent to contacts 10 can be described as follows:

$U = (Sab - Sc) \times (T1 - T2) \times I'/d \times \sin(\alpha)$

Here:
Sab/Sc: Seebeck coefficient (material constant YBCO: Sc roughly
15 microV/K, Sab 0 V/K)
I': spot diameter
d: layer thickness of the active layer
α: tilt angle
U: measured electrical output voltage
T1: temperature on the surface of the active layer
T2: Temperature on the transition between the active layer and substrate.

By the surface side facing away from layer 7 substrate 6 is attached directly to the inner surface of bottom 3. In bottom 3 cooling is formed symmetrically to center plane M to which sensor element 5 is also made mirror symmetrical with respect to contacts 10, and which also includes axis A. For this symmetrical cooling in the bottom, cooling space or cooling channel 12 is formed through which a coolant (for example, water) can flow. Cooling channel 12 extends perpendicular to the plane of the drawing in FIG. 1 over a length which is greater than the dimensions of sensor element 5 in the axial direction. Furthermore, the width of cooling channel 12 is likewise greater than the width of sensor element 5 so that it is cooled in all its areas reliably by the medium flowing through cooling channel 12.

To supply coolant, two connections 13 and 14 are used which are located symmetrical to center plane M. Coolant is drained in a symmetrical fashion to center plane M, for example by outlet 15 which extend over the entire width of cooling channel 12 located on one end of this channel.

To achieve especially good and uniform thermal contact between substrate 6 and bottom 3, substrate 6 is polished on its back and is applied with a thermally conductive paste to the polished surface of bottom 3. The fact that beam 9 to be measured using optics 8 is concentrated on spot diameter I' which is much smaller in its dimensions than the dimensions of active layer 7, along with the symmetrical cooling, results in the fact that at high continuous loading of up to 20 watt/cm$^2$, the drift or deviation, of the electrical signal on contacts 10, is at most 1 to 2%.

Figure 5:
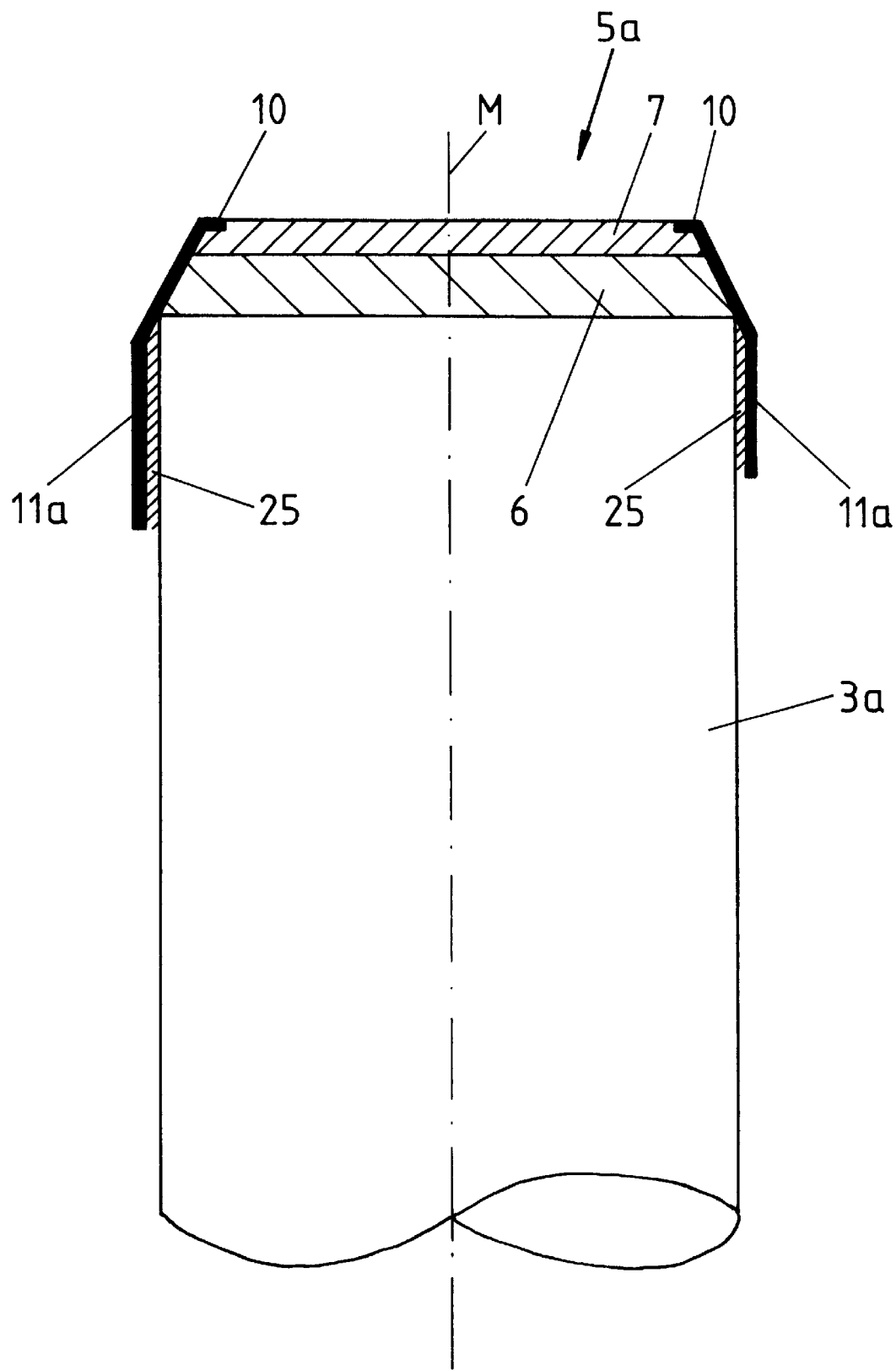
FIG. 5 shows in an enlarged detailed representation the sensor element of the temperature sensor of FIG. 4.

FIGS. 4 and 5 show temperature sensor 16 which is characterized by an especially prompt response behavior with response times in the 10 nanosecond range and which is thus suited for very high speed temperature measurements. These response times cannot be accomplished with temperature sensors currently on the market, for example, hot wire thermometers or thin film resistors.

Applications for temperature sensor 16 are among others —in flow engineering to study transitions between laminar and turbulent flow or —in combustion research, for example, in internal combustion engines, where high speed temperature sensor 16 makes it possible to acquire and display the time variation of a combustion process.

Temperature sensor 16 contains a tubular housing 17, with a sensor element 5a, on its one end. Sensor element 5a is built in the same way as sensor element 5, i.e., it contains a substrate 6 with an active layer 4 and of bottom or carrier 3a made as the cooling element. In any case sensor element 5a is made in the shape of an truncated pyramid on active layer 7 and substrate 6 is such that it tapers to the side formed by the active layer, and contacts 11a proceeding from active layer 7 extend obliquely to the back from active layer 7. Sensor element 5a with the side of its active layer 7 facing away from substrate 6 lies in one plane with the open side of housing 17. A space which remains between the inner surface of housing 17 and the peripheral surface of sensor element 5a is filled with a suitable embedding mass 18 which can withstand high thermal loads, especially such that contacts 11a are covered at least for the most part by embedding mass 18.

Sensor element 5a has back cooling to achieve a stable reference point. For cooling purposes carrier 3a is used which is produced as a cylinder piece from a material with good thermal conductivity, specifically from metal, and with its end facing away from substrate 6 extends into cooling space 17' which is formed within housing 17 and through which a cooling medium flows. Substrate 6 is attached to the other end of cylinder 3a. By means of the back cooling arrangement formed symmetrically to center plane M between contacts 10 and provided on carrier 3a temperature sensor 16 also has a distinct fixed reference point and drifting due to contact voltages is for the most part suppressed. The truncated pyramidal shape of the sensor element also contributes to this.

On the end of housing 17 facing away from the sensor element there is connection head 19 which has one electrical terminal 20 at which the electrical signal of sensor 5a can be picked up, and two connections 21 and 22 for the coolant, of which connection 21 is used to supply coolant to cooling space 17' and connection 22 is used to drain coolant from cooling space 17'. The coolant connections between connections 20 and 22 and cooling space 17' are accomplished for example by there being separating wall 23 in housing 17 and also head 19, the wall dividing the interior space formed by housing 17 and head 19 into two subchannels, the two channels each being connected to cooling space 17' and one subchannel having connection 22 and the other subchannel having connection 22.

Housing 17 has on its side a sensor element 5a which is sealed pressure tight. Furthermore housing 17 on its peripheral surface has outside thread 24 which enables temperature sensor 16 to be screwed, pressure tight, into the wall of the combustion space of an internal combustion engine. By means of the flatness on the side which has sensor element 5a temperature sensor 16 in the flow areas can be arranged on the same level with one wall so that projecting sections which extend into the flow are avoided.

By embedding contacts 11a in sealing compound 18 these contacts are embedded in a structure with a stable temperature with a relative large thermal time constant, so that disruptions of the measurement signals of active layer 7 which result from temperature-induced contact voltages are avoided, or which can be separated without problems from the high speed voltage signals of the active layer. It goes without saying that the contacts are electrically insulated against carrier 3a (insulator 25).

What is claimed is:

1. A thermoelectric sensor for determining or measuring the thermal power of radiation, especially laser radiation, having at least one thermoelectric detector or sensor element which has an active detector surface of a thin active layer (7) of a crystalline solid with anisotropic thermoelectric power, and in which a surface perpendicular of the layer does not coincide with one of the primary anisotropy directions, said thin active layer (7) having at least two contacts (10) for tapping a voltage dependent on the thermal output, comprising, in the path of a beam (9) to be measured, an optical means (8), which images said beam on said surface of said active layer (7) in a spot with a diameter (I') which is smaller in each axial direction lying in a plane of said surface of said active layer (7) than a dimension of said active layer (7) in a pertinent axial direction, and further comprising a cooling arrangement (12, 13, 14, 15) for said sensor element (5) which is made symmetrically to a center plane (M) which is located perpendicularly to said surface of said active layer (7) and to which said sensor element (5) is made mirror-symmetrical.

2. A sensor according to claim 1, wherein said optical means is a collimation lens (8).

3. A sensor according to claim 1, wherein said optical means (8) are adjustable in a direction of their optical axis.

4. A sensor according to claim 1, wherein said contacts (10) are produced by sputtering or laser sputtering on said surface of said active layer (7).

5. A sensor according to claim 1, wherein an external connection to said contacts (10) is produced via contact elements (11) which act as contact springs.

6. A sensor according to claim 1, wherein an area of said beam incident on said sensor element is at most equal to 50% of an area of said active layer (7).

7. A sensor according to claim 1, wherein a center of said beam incident on said sensor element is located in a middle of said contacts for tapping a voltage.

8. A thermoelectric sensor for determining or measuring temperature, having at least one thermoelectric detector or sensor element (5a) which has an active detector surface of a thin active layer (7) of a crystalline solid with isotropic thermoelectric power, and in which a surface perpendicularly to said layer does not coincide with one of the primary anisotropy directions, on said thin active layer (7) and there being at least two contacts (10) for applying a voltage dependent on a thermal power, wherein said thermoelectric sensor is made as a temperature sensor (16), and wherein there is a cooling arrangement (5a, 17') for sensor element (5a) which is made symmetrical to a center plane (M) which is located perpendicular to a plane of said active layer (7) and to which said sensor element (5a) is made mirror-symmetrical.

9. A sensor according to claim 8, further comprising contact elements (11) which are joined to said contacts (10) of said active layer (7) and which extend each from said plane of said active layer (7) to a back side of said sensor element (5a).

10. A sensor according to claim 8, wherein said cooling arrangement for said sensor element is attached on a carrier through which a thermally conductive coolant flows.

* * * * *